United States Patent [19]
Gemmani

[11] Patent Number: 5,971,381
[45] Date of Patent: Oct. 26, 1999

[54] SUPPORTING CROSS-BEAM FOR VACUUM HOLD-DOWN TABLES DESIGNED TO HOLD IN PLACE PANELS, IN PARTICULAR WOODEN PANELS

[75] Inventor: Giuseppe Gemmani, Rimini, Italy

[73] Assignee: SCM Group S.p.A, Rimini, Italy

[21] Appl. No.: 08/443,074

[22] Filed: May 17, 1995

[30] Foreign Application Priority Data

May 18, 1994 [IT] Italy .................................. B094A0231

[51] Int. Cl.⁶ ........................................................ B25B 11/00
[52] U.S. Cl. .............................................. 269/21; 269/61
[58] Field of Search ................................ 279/3; 451/388; 269/21, 56, 61, 74, 82, 71, 73

[56] References Cited

U.S. PATENT DOCUMENTS

| | | |
|---|---|---|
| 4,527,783 | 7/1985 | Collara . |
| 4,984,960 | 1/1991 | Szarka ........................................ 269/21 |
| 5,010,295 | 4/1991 | Lindsay ...................................... 269/21 |
| 5,116,174 | 5/1992 | Fried et al. ................................ 269/21 |
| 5,415,691 | 5/1995 | Fujiyama et al. ......................... 269/21 |

FOREIGN PATENT DOCUMENTS

| | | |
|---|---|---|
| 0 203 905 | 12/1986 | European Pat. Off. . |
| 0 229 668 | 7/1987 | European Pat. Off. . |
| 0 589 175 | 3/1994 | European Pat. Off. . |
| 94 02 252 U | 8/1994 | Germany . |

*Primary Examiner*—Robert C. Watson
*Attorney, Agent, or Firm*—Darby & Darby

[57] ABSTRACT

A cross-beam for a vacuum hold-down table formed by a monoblock section upon which a vacuum hold-down table is fitted and movable on slides. The monoblock section houses a first tubular chamber which extends along its length and is connected to external vacuum source. A part of the first chamber has an opening on which a magnetic seal with a plurality of evenly distributed holes is placed and fitted over this seal on the outside of the monoblock section first chamber is a deformable strip of magnetic material which is movable from one position which closes the first chamber to another position which opens the said chamber during the passage of a deflector unit on the strip which is fixed to the vacuum hold-down table and connects the first chamber and vacuum hold-down table at any point on the monoblock section.

11 Claims, 3 Drawing Sheets

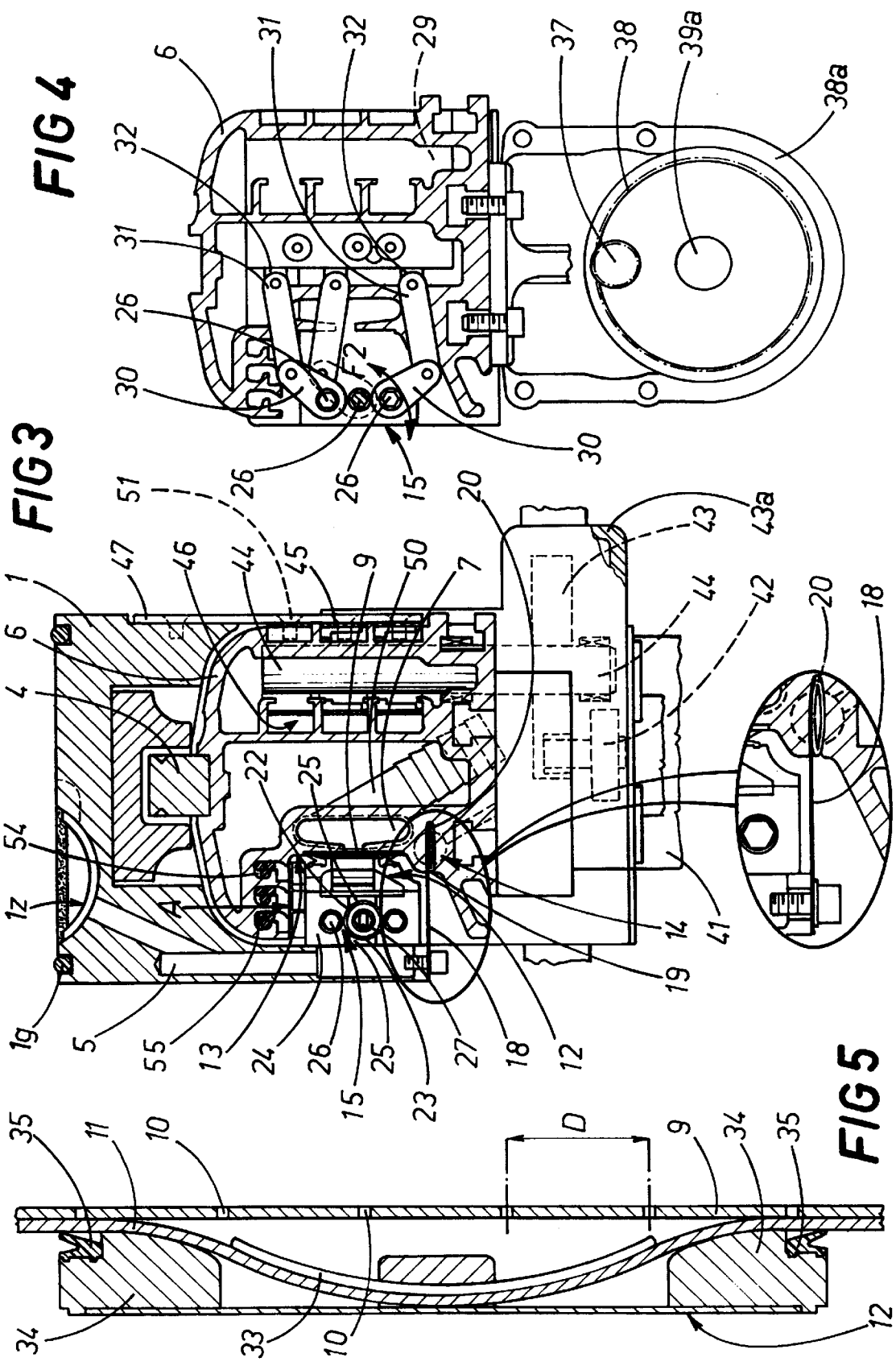

5,971,381

SUPPORTING CROSS-BEAM FOR VACUUM HOLD-DOWN TABLES DESIGNED TO HOLD IN PLACE PANELS, IN PARTICULAR WOODEN PANELS

BACKGROUND OF THE INVENTION

The present invention relates to a supporting cross-beam for vacuum hold-down tables designed to hold in place panels, in particular wooden panels. Machinery for the machining of wooden workpieces (in the present text wooden workpieces include items such as wooden boards, sections and panels used in the mass production of articles for industry or furnishings) currently have various types of tables designed to support and hold in place the workpieces so that precision machining can be effected on them. Of interest in the present invention are the type equipped with suction cups, on which the workpiece is held in place by means of a vacuum created by air suction.

Such tables are generally defined by a series of cross-beams, each supporting a plurality of vacuum hold-down tables which form the actual support surface for the workpieces. The cross-beams are parallel to one another and can be moved manually along the machine's longitudinal axis (usually called the X-axis) together with a pair of bilateral fences (using a manual locking and release system. Associated with each cross-beam are one or more vacuum hold-down tables which can be moved along the machine's transversal axis (usually called the Y-axis) by the operator, again manually. Each table consists of a horizontal support surface, upon which a seal is fitted. The configuration of the seal may vary according to hold-down requirements on certain areas of the workpiece, but it is always a single piece. The seal is inserted between the workpiece and the support surface, providing a vacuum in the desired zone by means of the suction produced by the relative pneumatic system located beneath the table, so as to hold down the workpiece securely.

However, these tables have several disadvantages, caused mainly by the pneumatic suction system which, in order to obtain optimum holding of the workpiece above, must have a plurality of pipes, one for each cross-beam and one for each vacuum hold-down table. The first pipes extend from the machine support base, the normal location of the suction means, and lead to the relative cross-beam, whilst the second pipes extend from the relative support table to a fitting which unites them with the corresponding first pipes. All pipes must also be long enough to allow the safe movement of both the cross-beams and the vacuum hold-down tables within the "ranges" of movement. Considering that a medium sized machine has more than one cross-beam, upon which at least two vacuum hold-down tables are fitted, a considerable number of pipe units are required in order to obtain normal air suction from the vacuum hold-down tables.

This pneumatic network normally used therefore requires many items of equipment (pipes and relative control systems) and occupies working space on the machine which, as a result, has only limited open areas without components. The disadvantage of this is that it is impossible to rapidly and safely clean away the shavings produced during machining, which usually fall in the areas beneath the vacuum hold-down tables. This difficulty arises due to the number of pipes and all of the electrical cables necessary for machine functioning.

SUMMARY OF THE INVENTION

The present invention relates to a new type of cross-beam to support the vacuum hold-down tables that is compact and has an architecture specially designed to simplify not only the support function, but also adjustment, positioning and safe air suction from the vacuum hold-down tables, with precision functioning. In the cross-beam of the invention there is a complete absence of peripheral pipes, thus reducing the machine's overall dimensions, creating overall design linearity and allowing the possibility of automatic movement and control of all components which rest against the items to be machined and of the relative functions.

BRIEF DESCRIPTION OF THE DRAWINGS

The technical specifications of the present invention, in accordance with the afore-mentioned objects, are clearly described in the claims herein, and their advantages made more evident in the detailed description below, with the aid of the accompanying drawings, which illustrate an example of an embodiment, in which:

FIG. 3 is a front view, with some parts cut away and some parts shown in cross-section, of the cross-beam of the present invention;

FIG. 4 is a cross-section along lines IV–V of in FIG. 2; and

FIG. 5 is a partial cross-section of an enlarged detail of FIG. 3.

DESCRIPTION OF THE PREFERRED EMBODIMENTS

Figure 1:
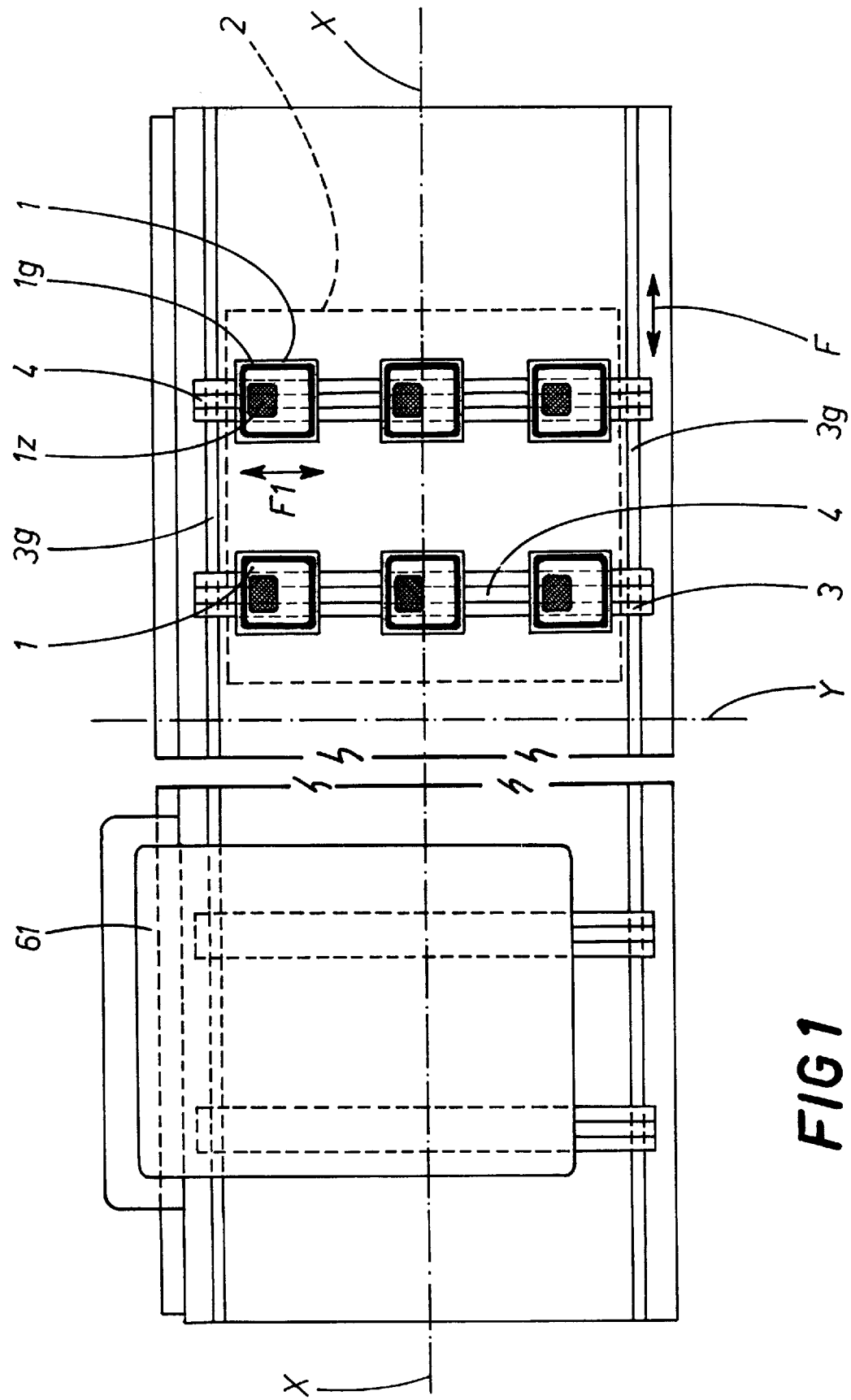
FIG. 1 is a schematic plan view of a machine for the machining of items such as wooden panels, on which the cross-beam of the present invention may be fitted for the support of the vacuum hold-down tables.

In accordance with the accompanying drawings, and in particular with reference to FIG. 1, the supporting cross-beam of the present invention supports the vacuum hold-down tables 1 designed to hold the panels to be machined 2 and is used on machines for the machining of the said panels.

Such a machine is usually equipped not only with a known machining unit 61 (generically illustrated, and which may be either for boring or routing the panel below), but also a plurality of cross-beams 3 (the number depending on the size and class of the machine), which can be moved along the machine's longitudinal or X-axis (see arrow F in FIG. 1) on the support of the machine's first parallel guides 3g. Each cross-beam 3 has one or more vacuum hold-down tables 1, which slide independent of one another on a second set of guides 4, on the cross-beam 3, and along the machine's transversal Y-axis (see arrow F1 in FIG. 1). Each of these vacuum hold-down tables 1 has an open area on its upper surface (labelled 1z), delimited by a seal 1g and having one or more internal air pipes 5, so that in the said area a vacuum is created by corresponding means 8, allowing the panels 2 resting on the table seals to be held in place. Normally, in the machine the panel 2 is moved forwards over the seals along the X-axis until it arrives beneath the relative machining unit 61, where it is held in place by the vacuum of the vacuum hold-down tables beneath it. Their number of vacuum hold-down tables depends on the size of the panel and the holding force necessary, which is proportional to the machining force of the relative tool. It is for this reason that such machines require a given number of vacuum hold-down tables, defining a matrix within which the individual tables must be easily and rapidly moved and blocked, activated or not, according to the size of the panel batches to be machined. The automation and controlled management of these "size changeovers" are, therefore, preferential feature.

Figure 2:
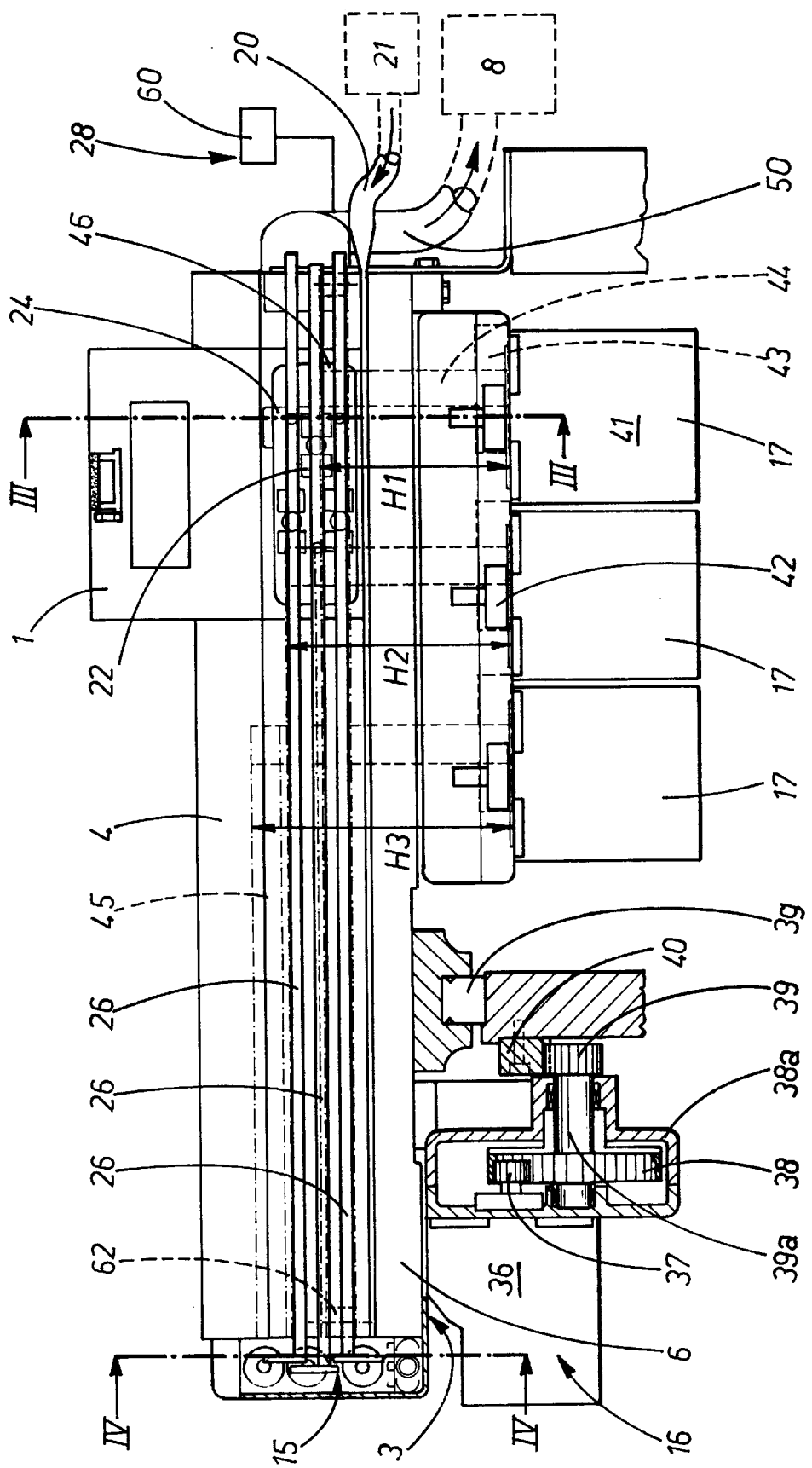
FIG. 2 is a side view, with some parts cut away to better view others, of the cross-beam shown in FIG. 1.

The cross-beam 3 of the present invention includes (see FIGS. 2, 3 and 4) of a monoblock section 6 upon which a plurality of vacuum hold-down tables 1 are mounted. The said tables slide over the cross-beam on the guides 4. The accompanying drawings show, by way of example only, a vacuum hold-down table 1 represented by a continuous line, and two other vacuum hold-down tables 1 represented by a broken line in order to simplify and to better show the technical solutions adopted on the cross-beam 3, said solutions being identical for each vacuum hold-down table 1 fitted on the same cross-beam 3. In view of this, hereinafter the details of only one vacuum hold-down table 1 and the relative equipment is illustrated.

The section 6, made of extruded aluminium, has an internal face and sides fitted with a first tubular chamber 7 which extends along the entire length of the section 6 and is joined at one end to the afore-mentioned external vacuum generation means 8, by an external outlet 50, whilst at the other end the said chamber is sealed by a cap, not illustrated here. An area of the side of this first chamber 7 is open (the slot extending along the entire length of the cross-beam). The entire length of this slot is sealed with a magnetic seal 9 with a plurality of holes 10 evenly distributed over its surface. To close the holes 10 in the seal 9, the latter is covered on the outside of the first chamber 7, with a strip 11 of deformable magnetic material. In the case described herein, the strip of magnetic material is, preferably, a steel strip, intended to be attracted by a magnet, or by means equipped with or able to generate a magnetic field, which in this case is the seal 9.

The strip 11 can be moved from a position in which it closes the holes 10 and, therefore, the first chamber 7 to a position which leaves part of the said chamber open, that is to say, in which a given number of the holes 10 are uncovered, corresponding to the passage of a deflector unit 12 on the strip. This unit (illustrated in FIG. 3) is attached to the corresponding vacuum hold-down table 1 and is housed in a relative sealed seat 13 on the section 6. The seat 13 is located between the first chamber 7 and the afore-mentioned pipes b of the relative vacuum hold-down table 1. In this way, the deformation of the strip 11 (that is to say, its raising from the magnetic seal 9) leaves open a given number of holes 10, creating a direct connection between the vacuum hold-down table 1 and the chamber 7, where air suction is effected irrespective of the position of the vacuum hold-down table 1 on the section 6. In practice, this system defines the passage of air from the first chamber 7 to the seat 13 of the vacuum unit which is not fixed, but moves in accordance with the traversing of the vacuum hold-down table on the cross-beam, eliminating all types of traditional flexible pipes.

More precisely (see FIG. 5) the deflector unit 12 has a curved rod 33 which extends parallel to the opening in the first chamber 7 and is inserted between the perforated seal 9 and the strip 11, thus deforming the latter. The rod 33 is secured to a support block 34, with a hole at the center and securely fitted inside the first chamber 7. The block 34 is connected to the vacuum hold-down table 1 so that its movements correspond to those of the latter, and has a perimeter seal 35 for the area through which the air passes when the strip 11 is deformed. Obviously, the distance D between each hole 10 is calculated according to the length of the curved rod 33, so that the deformation of the strip 11 uncovers a given number of holes 10, sufficient to allow correct, adequate suction.

The numeral 14 (see FIG. 3) indicates the means for stable positioning of the vacuum hold-down table 1 on the section 6, which operate between the two so as to hold the vacuum hold-down table on the section 6 whatever its position. In practice, these means 14 for stable positioning consist of a horizontal plate 18 (preferably made of spring steel) fixed, at one end, to the bottom of the vacuum hold-down table 1, whilst the other end slides within a slot 19 which extends along the entire length of the section 6. Inside the slot 19 is a pipe 20 with oval section (a slightly flattened pipe) which extends along the entire length of the section 6, sealed at one end, and at the other end connected to means 21 which supply air within the pipe itself, so that when the vacuum hold-down table 1 is in the desired position a variation (increase) in the section of the pipe 20 which blocks the plate 18 between the slot 19 and the pipe 20 is obtained. The slightly flattened pipe 20 is, therefore, a simple counter element designed to block the plate 18 "in place" and, as a result, block the associated vacuum hold-down table in place. When the pipe 20 is not subjected to pressure, a small amount of friction is generated between the plate 18, slot 19 and pipe 20 in any case, favouring the maintenance of the position assumed by the vacuum hold-down table.

Means 15 for the control of the vacuum generated in the individual vacuum hold-down tables 1 are also provided which are located in the sealed seat 13 and operated from outside the section 6. These means 15 slide together with the vacuum hold-down table 1 and can activate or deactive the vacuum action on the vacuum hold-down table 1 depending on the panel to be machined 2. More precisely (see FIG. 3) these control means 15 are formed by a cylinder 22 which rotates about its own axis, with a diametrical hole 23 (preferably defining a labyrinth closure) through the cylinder. This cylinder 22, which acts as a rotary valve, is located inside a case 24 which is fixed to the vacuum hold-down table 1, inside the afore-mentioned seat 13 of the section 6, and has a pair of openings 25 positioned coaxially to one another, one into the sealed seat 13, and the other into the pipes 5. The cylinder 22 is fitted axially and in such a way that it may slide on a relative control bar 26 of polygonal section (in the figures the section is hexagonal) and with a diametrical hole 27 positioned coaxially to the relative hole 23 in the cylinder 22.

The control bar 26 extends along the entire length of the section 6, supported by the latter at both ends, and can rotate about its own axis at the command of a relative actuator 29, located at one end of the section 6 and designed to turn the cylinder 22 (see arrow F2 in FIG. 4) from an idle position, in which the hole 23 in the cylinder 22 is not aligned with the openings 25 of the case 24 (vacuum hold-down table 1 not activated, i.e., valve defined by cylinder 22—case 24 closed), to an operating position, in which the through hole 23 in the cylinder 22 is coaxial to the openings 25, thus creating the connection between the first chamber 7 and the pipes 5 (vacuum hold-down table 1 activated) . In order to obtain rotation of the bar 26 with polygonal section, one end is connected to a pivotable crank lever 30, and the other end is attached to a connecting rod 31. The connecting rod 31 is, in turn, attached to the shaft 32 of the actuator 29 (for example, a pneumatic piston) which defines the afore-mentioned limit positions of the cylinder 22 when the shaft 32 moves forwards or backwards. The actuator 29 can also be operated from the machine's external control unit. In the embodiment illustrated there are three bars 26 and three vacuum hold-down tables 1.

The connection of a means 28 for the measurement of the pressure inside the first chamber 7 to the said chamber 7 is provided. These means may consist of a vacuum gauge 60, and controls (not shown) to inhibit machine activation in the presence of a pressure value other than the reference value. In practice, if a vacuum hold-down table 1 is covered by a panel 2 but the table hold is faulty, the pressure value inside the first chamber 7 is greater than the established value and the vacuum gauge 60 warns the machine control system that the panel 2 hold is incorrect, resulting in a machine stop.

Due thanks to the structure of the section 6, it is possible to add drive means, indicated by 16 and 17, for both the section 6 itself and for each vacuum hold-down table 1. In this way, it is possible to control their movements along the two working axes X and Y.

The drive means 16 (FIG. 2) for the section 6 includes a first variable speed motor 36 positioned on the lower external face of the section itself. The variable speed motor 36 has a first toothed pinion 37 which engages with a first crown gear 38, supported in such a way that it can rotate by a first casing 38a attached to the section 6. A shaft 39a is attached to the centre of the crown gear 38. The free end of the shaft is fitted with a toothed wheel 39 which engages with a rack 40 that extends transversally with respect to the section 6 and is attached to the first fixed guides 3g over which the section 6 slides. The motion of the toothed wheel 39 on the rack 40, therefore, moves the section 6 along the X-axis.

Independent drive means 17 are provided for the vacuum hold-down table 1, consisting of a second variable speed motor 41, fixed under the section 6, which drives a second toothed pinion 42; engaged, in turn, with a second crown gear 43; the latter is housed in a second hollow casing 43a, fixed to the section 6. A splined shaft 44 is attached to the center of the crown gear 43 and extends vertically at the side of the section 6 (see FIGS. 2 and 3). The splined shaft engages with a corresponding toothed belt 45, closed in a ring around the shaft and gears 62 (shown with a broken line) located at the end of the section 6. The belt 45 is housed in a second chamber 46, which is open to the outside and created on the section 6 in the opposite area to that of the afore-mentioned first chamber 7. FIG. 3 shows three chambers of different heights, and each chamber is designed to house one belt 45 for each of the vacuum hold-down tables 1 present. As a result, the final shafts 44 have projecting sections of different lengths, depending on the vacuum hold-down table 1 to be moved (see FIG. 2, where the belts are positioned at different heights H1, H2 and H3, starting from the variable speed motor 41). A plate 47 is then fixed to the belt 45 by using a screw 51 which is, in turn, attached to the relative vacuum hold-down table 1, thus allowing the tables to be moved on the section 6 and along the afore-mentioned Y-axis, independent of one another.

In addition to the elements described above, it is also possible to fit the cross-beam 3 with other devices, such as limit switches and microswitches for the positioning of each vacuum hold-down table 1 on Cartesian co-ordinates transmitted to the machine control system which, in turn, can make the necessary positioning adjustments on the vacuum hold-down table 1. For this purpose, the presence of third chambers 54 for the longitudinal passage of electric cable 55 is provided on the section 6. These third chambers are adjacent to one another and pass below the first chamber 7.

Starting from a machine stopped situation, a single cross-beam 3, structured as described, therefore, functions as follows.

When the new size is set on the machine, the control unit for all functions (a conventional numeric control system, interacting with a dedicated "software" system if required) checks the position of each vacuum hold-down table 1 on each cross-beam 3, in accordance with the dimensions of the panel to be held in place. At this point the operator may enter the data for positioning of the cross-beams 3 and the relative vacuum hold-down tables 1 (always for the X and Y axes), or directly enter the coded details of the batch to be machined, in order to rest the panels 2 to be held on the vacuum hold-down tables 1.

Upon completion of this operation, the drive means 16 and 17 are activated, to move the cross-beams 3 and each vacuum hold-down table 1 by means of the racks 40 and, respectively, the toothed belts 45. In order to do this, the pressure within the pipe 20 must be deactivated. Once positioned, the vacuum hold-down tables 1 are blocked in the desired position by the activation of the compressed air generation means 21, which allow the enlargement of pipe 20, and consequent pressure of the plate 18 against the vacuum hold-down table 1. At the same time, the bars 26 and relative cylinders 22 only of those vacuum hold-down tables required to hold the panel in place are turned, an operation easily effected using the software. The panels to be machined 2 are then positioned on the vacuum hold-down tables 1 and held in place by the activation of external suction means 8, which generate a vacuum in the first chamber 7, creating the holding vacuum on the relevant vacuum hold-down tables 1. During this operation the vacuum gauge 60 controls the pressure level in the first chamber 7, in order to check that the vacuum hold-down tables 1 effectively hold the panel 2. If the check Fives positive results, the machine may start machining on the panel 2. If, in contrast, there is a significant difference between the theoretical and actual pressure values, the control system inhibits activation of the machine until the correct pressure value is reset (that is to say, the position of the panel 2 on the vacuum hold-down table 1 is corrected). Obviously, the cylinders 22 of the vacuum hold-down tables 1 that are not used remain in the position which prevents the passage of air suction.

Therefore, with a cross-beam structured in this way, significant technical and design advantages are gained thanks to the elimination of many pipes. Only two pipes leave each cross-beam (one for suction from the first chamber, and the other to allow air into pipe 20 in order to block the vacuum hold-down table in position).

This construction, therefore, allows considerable spaces between the cross-beams, without elements which prevent the shavings produced during machining from falling beneath the cross-beam. In this way, hoppers for the collection of the shavings can be placed beneath the cross-beams, thus speeding up an operation which is usually slow and difficult.

The structure of the cross-beam has also allowed the creation of a system with two axes, X and Y, controlled both on the cross-beam and on each vacuum hold-down table, allowing all controls to be incorporated in a control system managed by special dedicated software for the machine. This control facilitates and speeds up operations which with conventional machines would all be the responsibility of the operator. Even the blocking in place of each vacuum hold-down table in the present invention is designed to be fully automatic.

The present invention, as described herein, may be subject to numerous modifications and variations, all encompassed by the design concept. Moreover, all parts may be replaced by technically equivalent parts.

What is claimed:

1. In a machine of the type including at least one suction type hold-down table for holding a panel in place to be worked by the machine, the machine having a first guide along one axis, the hold-down table including at least one supporting cross-beam that is slidable along and supported by the first guide, the cross-beam having a second guide directed along an axis transverse to the one axis and the at least one vacuum hold-down table being slidable on said second guide, said cross-beam having internal pipes to be connected to a suction source for the passage of suction air for generating a suction force in the areas of said hold-down table, the improvement comprising:

a monoblock section forming the supporting cross-beam, said monoblock section housing a first chamber extending along a substantial portion of its length and being connected at one end to the external suction source and sealed at the other end, an area of a side of said first chamber being open along a substantial portion of the length of the cross-beam;

a magnetic seal having a plurality of holes spaced along the open area of the side of said first chamber;

a deformable strip of magnetic material covering said magnetic seal on the outside of the said first chamber;

a deflector unit for raising said deformable strip from said magnetic seal, said deflector unit being attached to said hold-down table and housed in said monoblock section outside of said first chamber for selectively opening holes of the magnetic seal and permitting suction air flow therethrough.

2. In a machine as in claim 1 wherein the improvement further comprises:

means for positioning the hold-down table along the monoblock section located and operating between the monoblock section and hold-down table to block the hold-down table at any point along the monoblock section.

3. In a machine as in claim 1 wherein the improvement further comprises:

means for controlling the suction force generated in the hold-down table positioned in said sealed chamber and being operated from outside said monoblock section, and moving in correspondence with the said hold-down table for connecting or cutting off said first chamber from the suction air provided by the pipes.

4. In a machine as in claim 1 wherein the improvement further comprises:

means for measuring the suction force in the said first chamber and acting to inhibit activation of the machine if the measured suction force value differs from a reference value corresponding to that value by which a panel is firmly held by a hold-down table.

5. In a machine as in claim 1 wherein the said monoblock section and hold-down table have independent drive means to move them on the respective axes of the machine for the machining of a panel.

6. In a machine as in claim 2 wherein there are a plurality of said hold-down tables, said means for positioning comprises a horizontal plate fixed at one end to the lower section of said hold-down table, the other end of said plate being inserted in a slot which runs along substantially the entire length of said monoblock section; said slot housing a pipe of oval cross-section which extends along substantially the entire length of said monoblock section and is connected at one end to the suction source so that when at least one of the said hold-down tables is in the desired position a variation in the section of the pipe which blocks said plate is produced.

7. In a machine as in claim 3 wherein said means for controlling the suction force comprises:

a sealed seat for said monoblock section;

a cylinder with a diametrical through hole positioned to rotate inside a case, said case being fixed in said monoblock section and having a pair of openings positioned coaxially to one another, one into the sealed seat, and the other into the pipes; the cylinder being axially slidable to move a control bar with polygonal section and with a diametrical through hole positioned coaxially to the hole in the cylinder;

the control bar extending along the length of the monoblock section and rotatable about its own axis by a movable actuator located at one end of the monoblock section to move the cylinder between at least two limit positions, one being the idle position in which the hole in the cylinder is not aligned with the said openings, and the other being the operating position, in which the through hole in the cylinder is coaxial to the said openings, thus connecting the first chamber and the pipes.

8. In a machine as in claim 7 wherein said bar with polygonal section is attached at one end to a pivotable crank lever and at the other end to a connecting rod which is attached to the shaft of said actuator which defines the said limit positions of the cylinder.

9. In a machine as in claim 1 wherein said deflector unit has a curved rod which extends parallel to said open side of said first chamber between said magnetic seal and said strip to define the deformation of said strip, said rod being attached to a support block having a hole and connected to said hold-down table, and a perimeter seal on a wall of said first chamber for sealing the area through which the air passes when the strip is deformed.

10. In a machine as in claim 5 wherein said drive means for said monoblock section includes a first variable speed motor positioned on an external surface of said section which drives a first toothed pinion that engages with a first crown gear housed in a first hollow casing attached to said section and to the center of which a first shaft is attached, one end of the shaft being fitted with a toothed wheel which engages with a rack that extends transversely of said section and is attached to the first guide of the machine over which the monoblock section slides, moving the section along the machine axis.

11. In a machine as in claim 5 wherein said drive means for said hold-down table further comprises a second variable speed motor mounted to said monoblock section which drives a second toothed pinion engaged with a second crown gear housed in a second hollow casing mounted to said movable section;

a splined shaft attached to the center of said second crown gear and extending vertically at the side of said section; the splined shaft engaging with a corresponding toothed belt closed in a ring around the shaft, said belt being housed in a second open chamber on said monoblock section in an an area opposite to that of said first chamber; and a plate fixed to said belt, attached to said hold-down table to allow movement of the table on said section.

* * * * *